(12) United States Patent
Iriguchi

(10) Patent No.: US 9,746,531 B2
(45) Date of Patent: Aug. 29, 2017

(54) MAGNETIC SENSOR CIRCUIT

(71) Applicant: SII Semiconductor Corporation, Chiba (JP)

(72) Inventor: Masao Iriguchi, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 15/058,807

(22) Filed: Mar. 2, 2016

(65) Prior Publication Data

US 2016/0259017 A1 Sep. 8, 2016

(30) Foreign Application Priority Data

Mar. 5, 2015 (JP) .................................. 2015-043913
Jan. 21, 2016 (JP) .................................. 2016-010006

(51) Int. Cl.
| | |
|---|---|
| G01R 33/06 | (2006.01) |
| G01R 33/00 | (2006.01) |
| G01R 33/07 | (2006.01) |
| H01L 21/00 | (2006.01) |

(52) U.S. Cl.
CPC ..... *G01R 33/0029* (2013.01); *G01R 33/0088* (2013.01); *G01R 33/0094* (2013.01); *G01R 33/07* (2013.01); *G01R 33/075* (2013.01); *G06F 2101/00* (2013.01); *H01L 21/00* (2013.01); *H01L 2221/00* (2013.01)

(58) Field of Classification Search
CPC ....... H01L 21/00; H01L 2221/00; G06F 1/00; G06F 2101/00

See application file for complete search history.

(56) References Cited

U.S. PATENT DOCUMENTS

| | | | |
|---|---|---|---|
| 5,621,319 A | 4/1997 | Bilotti et al. | |
| 6,927,572 B2 | 8/2005 | Motz | |
| 2007/0057670 A1* | 3/2007 | Kobayashi | G01R 33/04 324/253 |
| 2009/0237844 A1* | 9/2009 | Duric | G01R 33/09 360/324 |
| 2010/0211347 A1* | 8/2010 | Friedrich | G01R 33/0023 702/117 |
| 2012/0194179 A1 | 8/2012 | Motz | |
| 2013/0076350 A1* | 3/2013 | Muraoka | G01R 33/072 324/244 |
| 2013/0099782 A1 | 4/2013 | Kejik et al. | |

(Continued)

OTHER PUBLICATIONS

Extended Search Report in corresponding European Application No. 16158719.1, dated Jul. 28, 2016, 12 pages.

*Primary Examiner* — Jermelle M Hollington
*Assistant Examiner* — Temilade Rhodes-Vivour
(74) *Attorney, Agent, or Firm* — Brinks Gilson & Lione

(57) ABSTRACT

To provide a magnetic sensor circuit which does not output spike-like voltage errors to a signal processing circuit. A magnetic sensor circuit is provided which is configured so as to output an output signal to a signal processing circuit through a plurality of hall elements driven by a first switch circuit and a second switch circuit controlled by a second control circuit and in which the first switch circuit controls timings at which spikes occur in the output signal of each of the hall elements in such a manner that the timings are not the same, and the second switch circuit selects and outputs an output signal having a period of a timing free of the occurrence of a spike.

4 Claims, 16 Drawing Sheets

(56) References Cited

U.S. PATENT DOCUMENTS

2013/0193962 A1* 8/2013 Okatake ............... G01R 33/075
                                                    324/251
2014/0327435 A1   11/2014 Röhrer
2016/0047864 A1*  2/2016 Nishimura ........... G01R 15/202
                                                    324/225

* cited by examiner

`US 9,746,531 B2`

MAGNETIC SENSOR CIRCUIT

RELATED APPLICATIONS

This application claims priority under 35 U.S.C. §119 to Japanese Patent Applications No. 2015-043913 filed on Mar. 5, 2015 and No. 2016-010006 filed on Jan. 21, 2016, the entire content of which is hereby incorporated by reference.

BACKGROUND OF THE INVENTION

Field of the Invention

The present invention relates to a magnetic sensor circuit, and more specifically to a magnetic sensor circuit capable of reducing spikes generated when switching terminals of a hall element.

Background Art

Although a hall element and a signal processing circuit are included in a magnetic sensor circuit, an offset voltage occurs in the hall element or the signal processing circuit, and a voltage which is not zero is outputted even in a zero magnetic field state in which no magnetic field is applied.

As the causes of the offset voltage of the hall element, there are mentioned variations and stress in manufacturing, the influence of a peripheral magnetic field, etc. A driving method called a spinning current method is generally used for the problem of the offset voltage of the hall element.

When, in the case where terminals are respectively placed at the four corners of a square-shaped hall element, a driving current is made to flow into a 0-degrees opposite terminal and a driving current is made to flow into a 90-degrees opposite terminal, offset voltages are opposite in phase and voltages corresponding to a magnetic field become inphase when the magnetic field is applied. Therefore, signal processing is performed by adding these together and taking out a significant signal reduced in offset error.

FIG. 17 is a circuit diagram illustrating a related art twice-spinning magnetic sensor circuit.

A hall element 1 has four terminals (nodes N1 to N4) and is connected to a power supply voltage and a ground voltage through a first switch circuit 3 controlled by a first control circuit 5. A signal processing circuit 2 is connected to the hall element 1 through a second switch circuit 4 controlled by a second control circuit 6.

FIG. 18 illustrates a time chart of the related art twice-spinning magnetic sensor circuit. In the drawing, a switch is turned ON when a control signal is at a high level. The switch is turned OFF when the control signal is at a low level. One spinning period is divided into two of a period $\Phi 1$ and a period $\Phi 2$.

During the period $\Phi 1$, control signals SS1V, SS1G, SS1P, and SS1M respectively become a high level. Thus, during the period $\Phi 1$, a constant current source 15 is connected to the node N2, the ground voltage is connected to the node N4, the node N1 is connected to a positive input terminal INP, and the node N3 is connected to a negative input terminal INM.

During the period $\Phi 2$, control signals SS2V, SS2G, SS2P, and SS2M respectively become a high level. During the period $\Phi 2$, the constant current source 7 is connected to the node N3, the ground voltage is connected to the node N1, the node N2 is connected to the positive input terminal INP, and the node N4 is connected to the negative input terminal INM.

With the above connections, a differential signal (INP−INM) becomes a signal voltage Vsig corresponding to magnetism during the periods $\Phi 1$ and $\Phi 2$. Further, a negative spike-like voltage occurs during the period $\Phi 1$ immediately after switching, and a positive spike-like voltage occurs during the period $\Phi 2$.

As countermeasures for the above-described spike-like voltage errors, there are known methods disclosed in Patent Document 1 and Patent Document 2. In Patent Document 1, spike-like voltage errors generated upon clockwise and counterclockwise spinning switching are added or averaged utilizing that the spike-like voltage errors occur in positive/negative reverse sign, thereby reducing the errors. On the other hand, Patent Document 2 is based on a discrete signal processing circuit having a sample-and-hold circuit with respect to one hall element. Immediately after the spinning switching, the hall element and the signal processing circuit are separated and the signal processing circuit performs signal processing on the basis of a signal sampled and held by the sample-and-hold circuit. Therefore, signal transfer in a spike-like error period immediately after switching is masked, and the influence of the spike-like errors to signal processing accuracy is reduced.

[Patent Document 1] U.S. Pat. No. 6,927,572 Specification

[Patent Document 2] U.S. Pat. No. 5,621,319 Specification

SUMMARY OF THE INVENTION

Although the method of canceling the positive spike-like error and the negative spike-like error is adopted as the method disclosed in Patent Document 1, the positive spike-like error and the negative spike-like error do not perfectly coincide with each other due to variations in manufacture, an element configuration, etc., thus causing a residual error.

The method disclosed in Patent Document 2 is based on the discrete time signal processing with a sample-and-hold circuit. Since there exists the masked period in which the output signal of the hall element is not transmitted to the signal processing circuit, the method is not suitable for the consecutive time signal processing.

The present invention has been made with the foregoing in view. It is an object of the present invention to provide a magnetic sensor circuit having a circuit for reducing spike-like voltage errors, which is suitable even for both of a consecutive time signal processing circuit and a discrete time signal processing circuit.

The invention disclosed in the present application is substantially configured in the following manner as means for solving problems.

There is provided a magnetic sensor circuit which includes a plurality of hall elements equipped with a plurality of terminals; a first switch circuit which is provided between the terminals of the hall elements, and a power supply terminal and a ground terminal and supplies driving currents to the hall elements by switching; a second switch circuit which is connected to the terminals of the hall elements and selects and outputs output signals of the hall elements; a first control circuit which outputs a first control signal to the first switch circuit; a second control circuit which outputs a second control signal to the second switch circuit; and a signal processing circuit which performs signal processing in response to the output signal outputted from the second switch circuit, and in which the first control circuit controls the hall elements in such a manner that timings at which spikes occur in the output signals of the hall elements become different from each other, in which the second control circuit controls the second switch circuit in such a manner that the second switch circuit does not select the output signal having a predetermined period during which spikes occur, out of the output signals of the hall elements, and selects the output signal having a predetermined period free of the occurrence of spikes out of the output signals of the hall elements, and in which at least one output signal of either of the hall elements is selected and outputted during all periods as the output of the second switch circuit.

According to the present invention, there is not generated a residual error which occurs where spike-like voltage errors immediately after spinning switching at each hall element are cancelled directly by positive and negative spikes. Also, spike-like voltage errors caused by the capacity of each hall element can substantially be reduced by selecting and outputting a voltage value after a predetermined time during which a spike-like voltage disappears, by using a plurality of hall elements. Since a signal of a period during which spike-like errors disappear is always used, a spinning frequency can be made faster.

Further, according to the present invention, since each individual hall element avoids a period of spike-like errors, a processing conversion rate of a signal processing circuit (e.g., analog-to-digital converter) can be made faster.

Also, the present invention is capable of consecutively propagating an output signal voltage of each hall element to the signal processing circuit and is suitable for consecutive signal processing. Further, when the signal processing circuit is used by performing multiple sampling in first and second phases, a hall output signal can be propagated without intermission. Moreover, since no wasteful charge/discharge is generated in the case of discrete time signal processing using an instrumentation amplifier, current consumption of the instrumentation amplifier can be reduced.

DETAILED DESCRIPTION OF THE PREFERRED EMBODIMENTS

Preferred embodiments of a magnetic sensor circuit of the preset invention will hereinafter be described with reference to circuit diagrams.

<First Embodiment>

Figure 1:
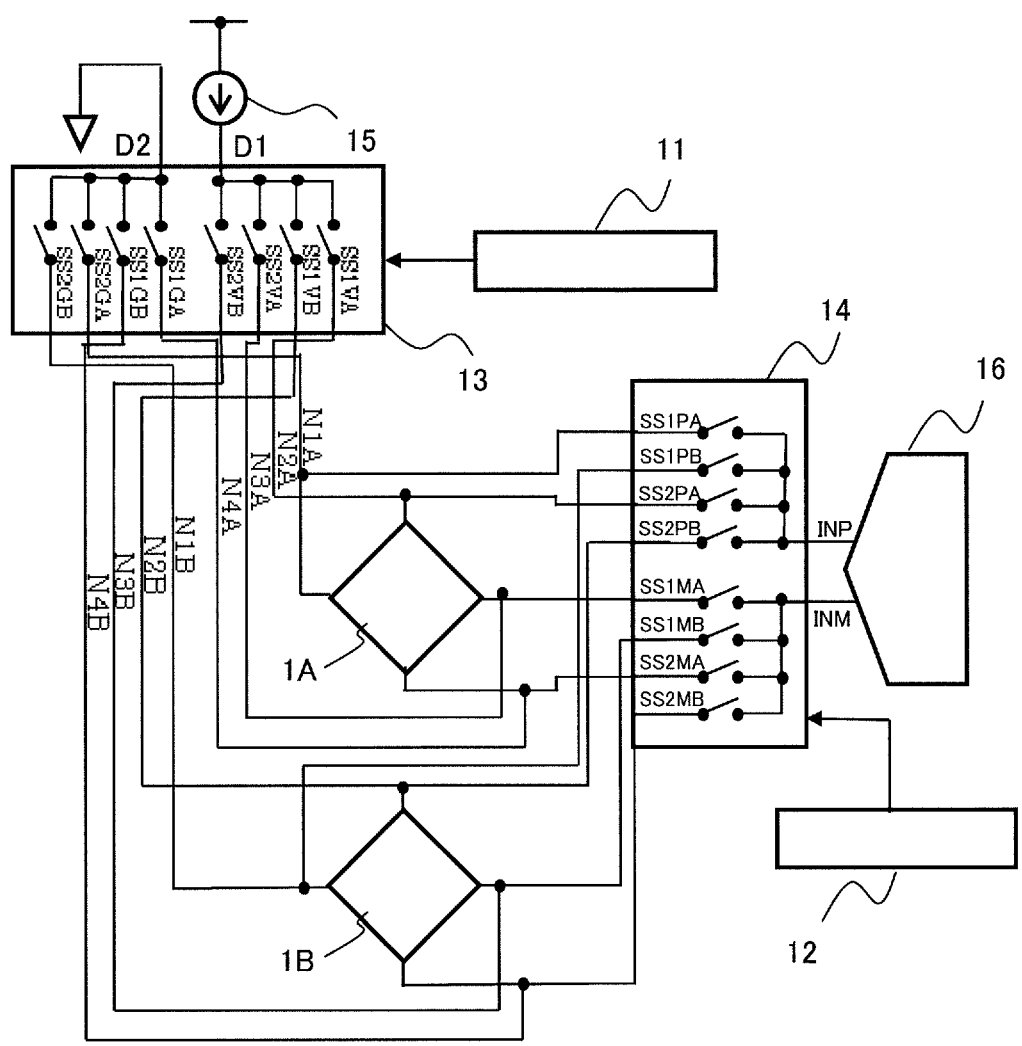
FIG. 1 is a circuit diagram of a magnetic sensor circuit according to a first embodiment.

FIG. 1 is a circuit diagram of a magnetic sensor circuit according to a first embodiment.

The magnetic sensor circuit is equipped with a first hall element 1A, a second hall element 1B, a first switch circuit 13, a second switch circuit 14, a first control circuit 11, a second control circuit 12, a constant current source 15, and a signal processing circuit 16. The signal processing circuit 16 corresponds to a filter processing circuit related to a chopping modulation/demodulation circuit, an addition or the like, an analog-to-digital converter, a comparator (magnetic switch circuit), etc.

The first hall element 1A has four terminals. Nodes of the respective terminals are assumed to be N1A to N4A. The second hall element 1B has four terminals. Nodes of the respective terminals are assumed to be N1B to N4B. The signal processing circuit 16 has a positive phase input terminal INP and a negative phase input terminal INM.

The first hall element 1A and the second hall element 1B are connected to a power supply voltage and a ground voltage through the first switch circuit 13 controlled by the first control circuit 11 and connected to the signal processing circuit 16 through the second switch circuit 14 controlled by the second control circuit 12.

Respective switches of the first switch circuit 13 are respectively controlled by control signals SS1VA, SS1VB, SS2VA, SS2VB, SS1GA, SS1GB, SS2GA, and SS2GB. Respective switches of the second switch circuit 14 are respectively controlled by control signals SS1PA, SS1PB, SS2PA, SS2PB, SS1MA, SS1MB, SS2MA, and SS2MB.

Figure 2:
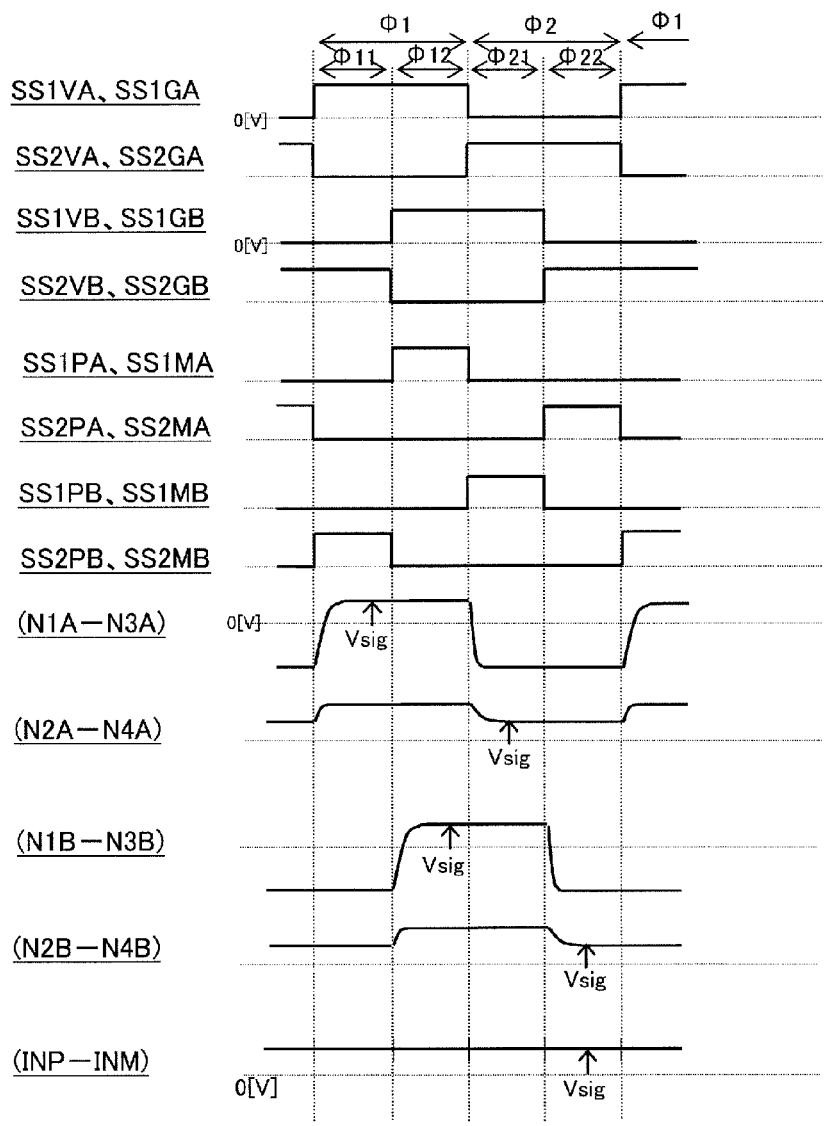
FIG. 2 is a time chart illustrating a circuit operation of the magnetic sensor circuit according to the first embodiment.

The operation of the magnetic sensor circuit according to the first embodiment will next be described. FIG. 2 is a time chart illustrating a circuit operation of the magnetic sensor circuit according to the first embodiment.

One spinning period is divided into a period Φ1 and a period Φ2. Further, the period Φ1 is divided into a sub-period Φ11 and a sub-period Φ12. The period Φ2 is divided into a sub-period Φ21 and a sub-period Φ22. The control signals SS1VA and SS1GA become a high level during the period Φ1, the control signals SS2VA and SS2VG become a high level during the period Φ2, the control signals SS1VB and SS1GB become a high level during the periods Φ12 and Φ21, and the control signals SS2VB and SS2GB become a high level during the periods Φ22 and Φ11. Further, the control signals SS1PA and SS1MA become a high level during the period Φ12, the control signals SS2PA and SS2MA become a high level during the period Φ22, the control signals SS1PB and SS1MB become a high level during the period Φ21, and the control signals SS2PB and SS2MB become a high level during the period Φ11.

Thus, during the period Φ11, the constant current source 15 is connected to the node N2A, and the ground voltage is connected to the node N4A, the constant current source 15 is connected to the node N3B, the ground voltage is connected to the node N1B, whereby the two hall elements are driven. Further, the hall element node N2B of the hall element 1B is connected to the positive phase input terminal INP, and the hall element node N4B of the hall element 1B is connected to the negative phase input terminal INM. Since a spinning switching timing of the hall element 1B corresponds to the start time of the period Φ22 during this period, no spike-like voltage errors occur in a differential output signal (INP-INM). The principle of operation during the periods Φ12, Φ21 and Φ22 is also similar to the above. A differential signal during the period in which spike-like voltage errors of either one of the hall element 1A and the hall element 1B do not occur is selected and outputted as an input signal (INP-INM) for the signal processing circuit 16.

Thus, the magnetic sensor circuit according to the first embodiment has an advantage that no spike-like errors occur in the input of the signal processing circuit 16. In addition to the above, in the present embodiment, a spinning frequency and a signal processing conversion rate (e.g., sampling rate of analog-to-digital converter) of the signal processing circuit 16 can be more raised by masking a period of spike-like errors and selecting a voltage of a stable period. Thus, it is possible to keep the S/N of the magnetic sensor circuit constant.

Further, the magnetic sensor circuit enables the signal processing circuit 16 to consecutively propagate the output signal voltage of each hall element and is suitable for consecutive signal processing.

Furthermore, an advantageous effect is brought about in that in the case of discrete-time signal processing using an instrumentation amplifier, no wasteful charge/discharge occurs and hence current consumption of the instrumentation amplifier does not increase.

<Second Embodiment>

Figure 3:
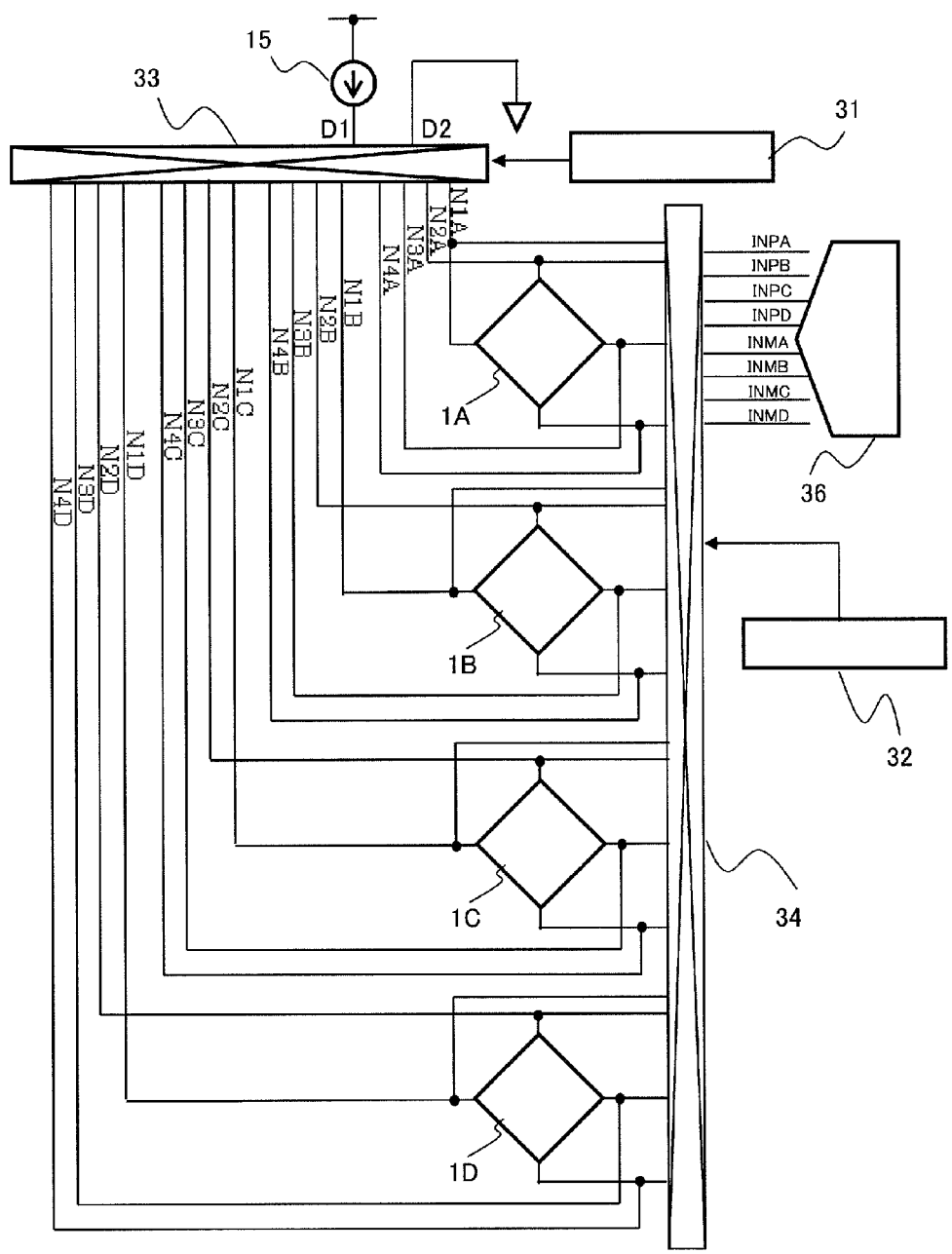
FIG. 3 is a circuit diagram of a magnetic sensor circuit according to a second embodiment.

FIG. 3 is a circuit diagram of a magnetic sensor circuit according to a second embodiment.

The magnetic sensor circuit according to the present embodiment is equipped with a first hall element 1A, a second hall element 1B, a third hall element 1C, a fourth hall element 1D, a first switch circuit 33, a second switch circuit 34, a first control circuit 31, a second control circuit 32, and a signal processing circuit 36.

The third and fourth hall elements 1C and 1D have four terminals as with the first and second hall elements 1A and 1B. Nodes of the respective terminals are assumed to be N1C to N4C and N1D to N4D. The signal processing circuit 36 has positive phase input terminals INPA, INPB, INPC, and INPD, and negative phase input terminals INMA, INMB, INMC, and INMD.

As the hall elements, the third hall element 1C and the fourth hall element 1D are added to the magnetic sensor circuit according to the first embodiment and similarly connected between the first switch circuit 33 and the second switch circuit 34.

Figure 4:
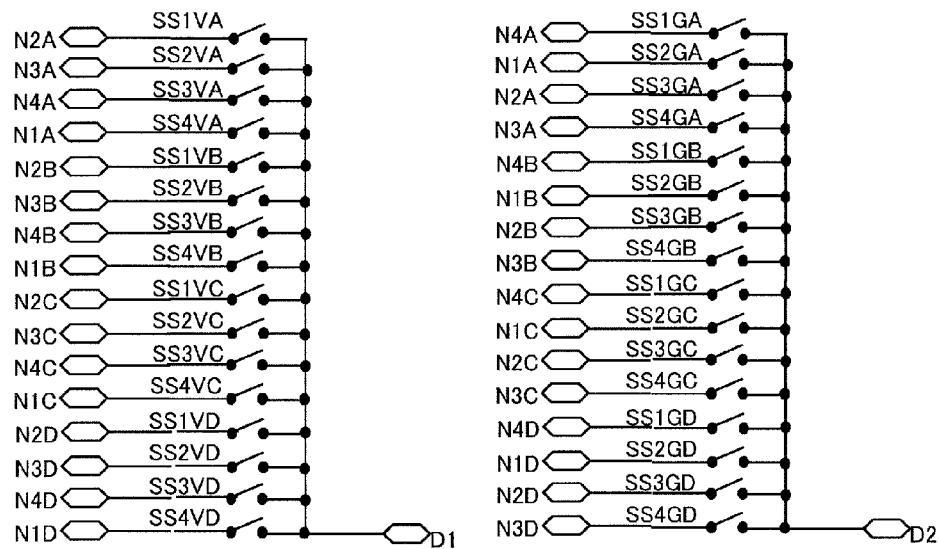
FIG. 4 is a circuit diagram illustrating one example of a first switch circuit of the magnetic sensor circuit according to the second embodiment.

The first switch circuit 33 is similarly added with switches depending on the four hall elements. FIG. 4 is a circuit diagram illustrating one example of the first switch circuit 33. Each input terminal, each output terminal and each switch are connected and controlled in such a relationship as illustrated in the drawing.

Figure 5:
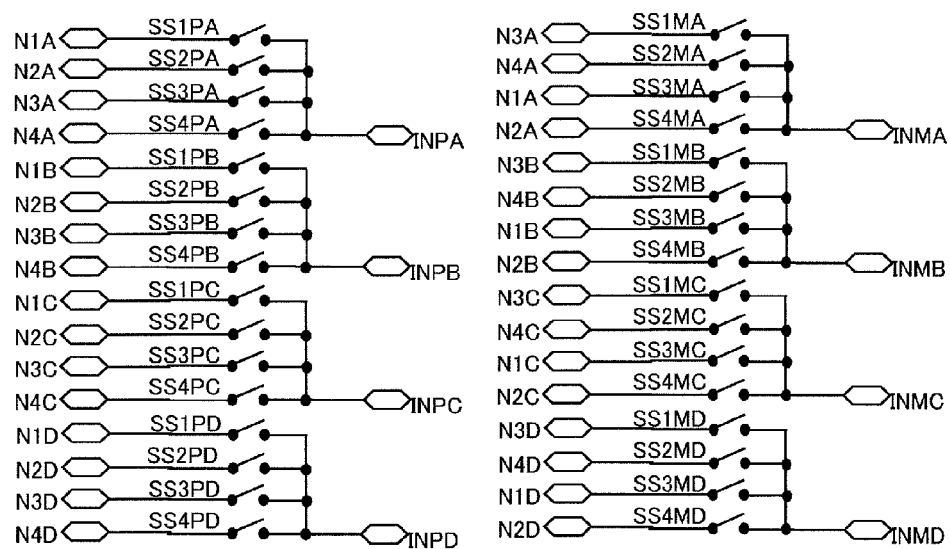
FIG. 5 is a circuit diagram illustrating one example of a second switch circuit of the magnetic sensor circuit according to the second embodiment.

The second switch circuit 34 is equipped with eight output terminals corresponding to the input terminals of the signal processing circuit 36. FIG. 5 is a circuit diagram illustrating one example of the second switch circuit 34. Each input terminal, each output terminal, and each switch are connected and controlled in such a relationship as illustrated in the drawing.

Although nodes for the positive phase input terminals (INPA, INPB, INPC, and INPD) and nodes for the negative phase input terminals (INMA, INMB, INMC, and INMD) are provided at four each, signals of these terminals are converted into be brought to a voltage level or a current level and subjected to addition signal processing by an addition circuit (not shown) in the signal processing circuit 36.

Figure 6:
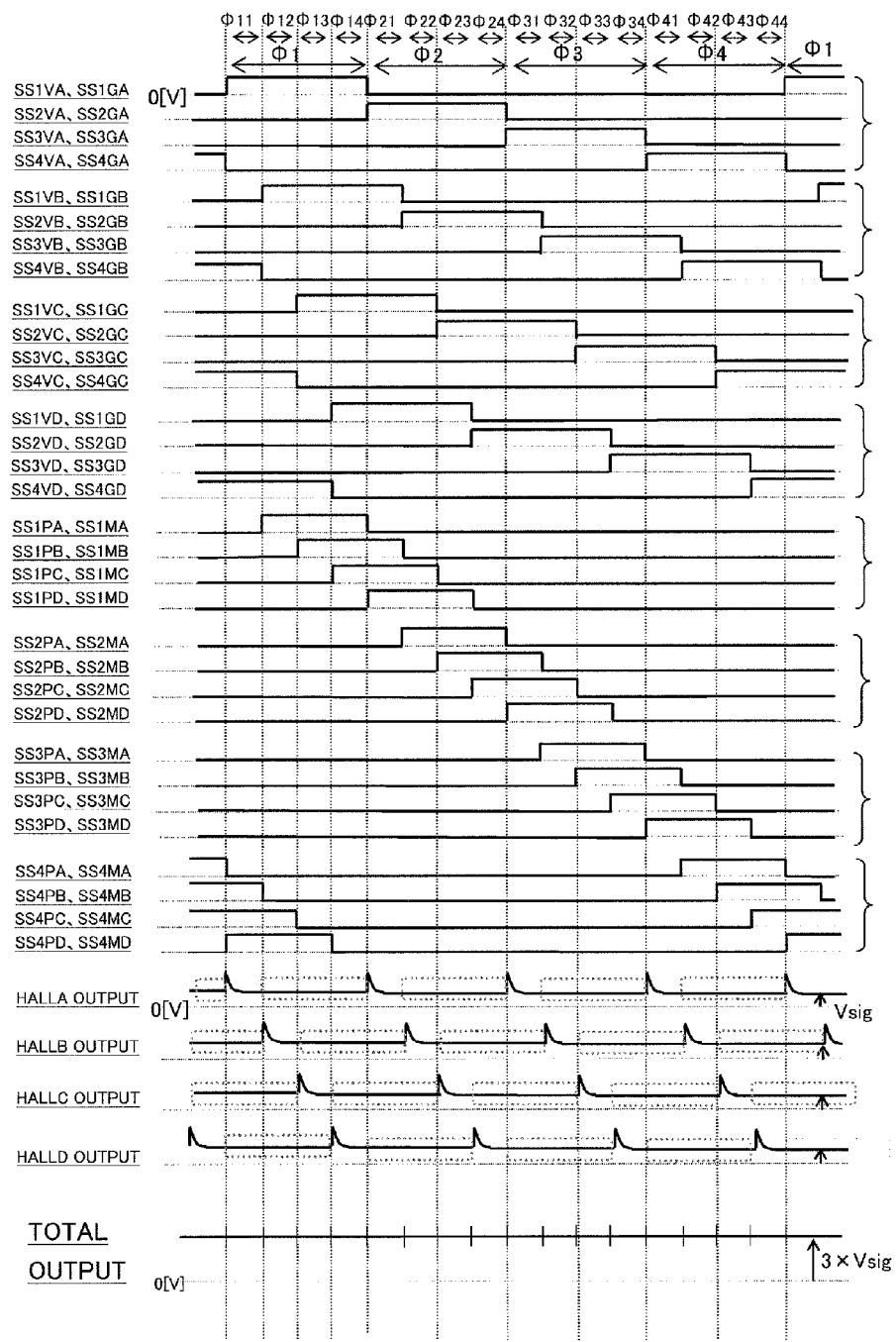
FIG. 6 is a time chart illustrating a circuit operation of the magnetic sensor circuit according to the second embodiment.

The operation of the magnetic sensor circuit according to the second embodiment will next be described. FIG. 6 is a time chart illustrating the circuit operation of the magnetic sensor circuit according to the second embodiment.

One spinning period is divided into a period Φ1, a period Φ2, a period Φ3, and a period Φ4. Further, the period Φ1 is divided into sub-periods Φ11, Φ12, Φ13, and Φ14. The period Φ2 is divided into sub-periods Φ21, Φ22, Φ23, and Φ24. The period Φ3 is divided into sub-periods Φ31, Φ32, Φ33, and 034. The period Φ4 is divided into sub-periods Φ41, Φ42, Φ43, and Φ44. Control signals SS1VA and SS1GA become a high level during the period Φ1, control signals SS2VA and SS2VG become a high level during the period Φ2, control signals SS3VA and SS3VG become a high level during the period Φ3, and control signals SS4VA and SS4VG become a high level during the period Φ4. They serve as control signals for driving the hall element 1A. Signals for driving other hall elements 1B, 1C, and 1D also have four phases in like manner, but the phase of each clock is shifted by one sub-period at each hall element as illustrated in FIG. 6.

As to control signals related to an output signal of the hall element 1A, the control signals SS1PA and SS1MA become a high level during periods Φ12 to 014, the control signals SS2PA and SS2MA become a high level during periods Φ22 to Φ24, the control signals SS3PA and SS3MA become a high level during periods Φ32 to Φ34, and the control signals SS4PA and SS4MA become a high level during periods Φ42 to Φ44. Other hall elements 1B, 1C, and 1D also have control signals having a similar phase relationship as illustrated in FIG. 6, but the phase of each clock is shifted by one sub-period at each hall element.

Thus, although a spike occurs in the hall element 1A during the sub-period Φ11, the three signals of the hall elements 1B, 1C, and 1D are inputted to the signal processing circuit 36. Similarly even in other sub-periods, the output signals of the three hall elements free of the occurrence of spikes are transmitted to the signal processing circuit 36 where they are added together.

Accordingly, the magnetic sensor circuit according to the present embodiment has an advantage that no spike-like errors occur in the input of the signal processing circuit 36. Further, the magnetic sensor circuit enables the signal processing circuit 36 to consecutively propagate the output signal voltage of each hall element and is suitable for consecutive signal processing.

<Third Embodiment>

Figure 7:
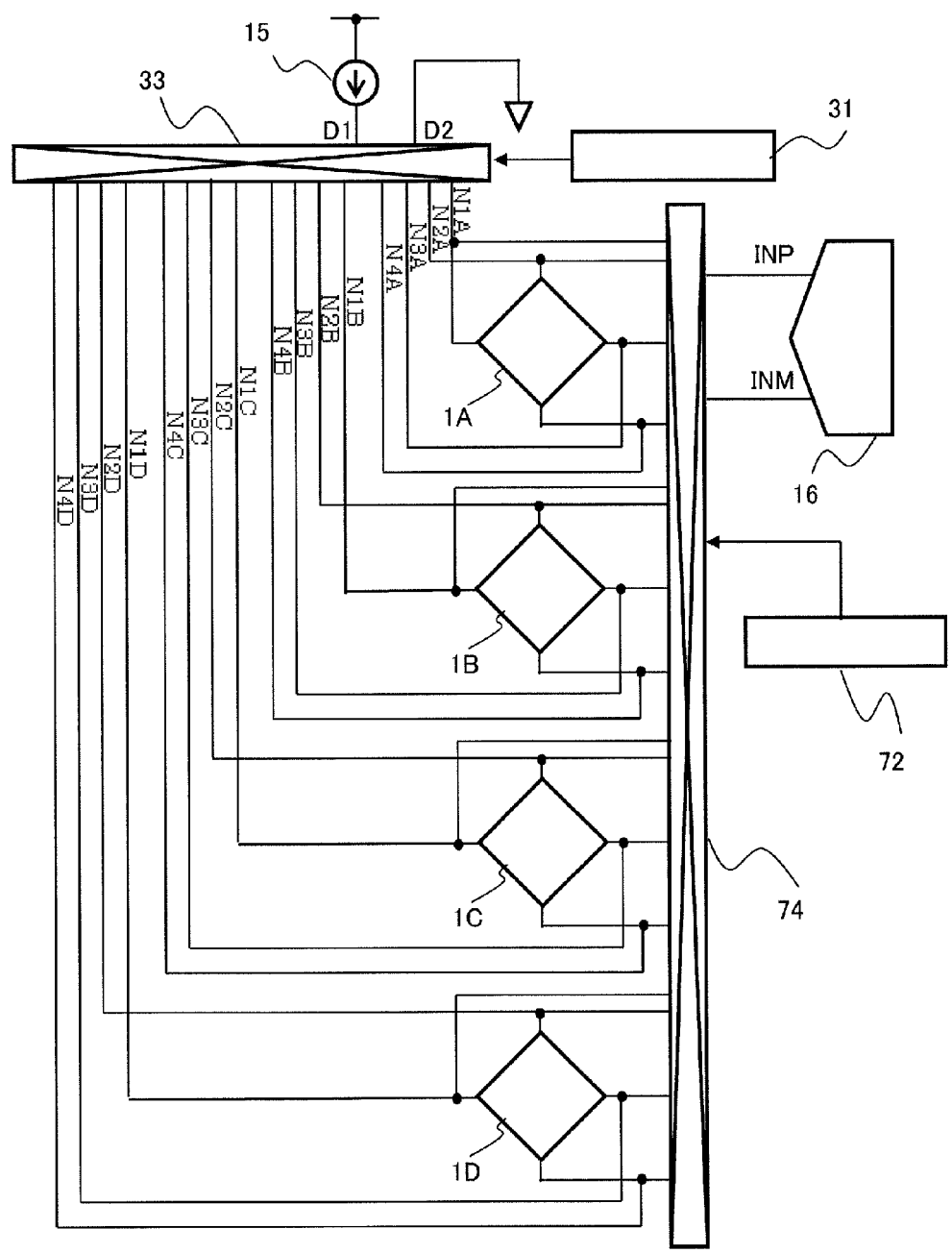
FIG. 7 is a circuit diagram of a magnetic sensor circuit according to a third embodiment.

FIG. 7 is a circuit diagram of a magnetic sensor circuit according to a third embodiment.

The magnetic sensor circuit according to the present embodiment is equipped with a first hall element 1A, a second hall element 1B, a third hall element 1C, a fourth hall element 1D, a first switch circuit 33, a second switch circuit 74, a first control circuit 31, a second control circuit 72, and a signal processing circuit 16.

A different point of the third embodiment from the second embodiment resides in that the second switch circuit 74 and the second control circuit 72 are respectively different in configuration and control signal, and the signal processing circuit 16 is configured to take a positive phase input terminal INP and a negative phase input terminal INM as a pair.

Figure 8:
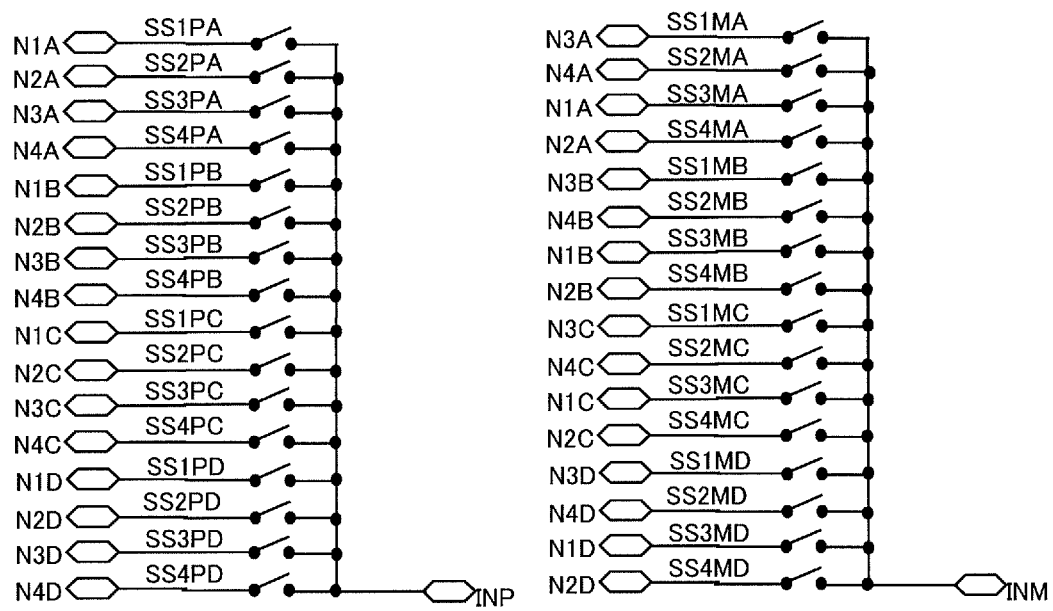
FIG. 8 is a circuit diagram illustrating one example of a second switch circuit of the magnetic sensor circuit according to the third embodiment.

FIG. 8 is a circuit diagram illustrating one example of the second switch circuit 74. Each input terminal, each output terminal, and each switch are connected and controlled in such a relationship as illustrated in the drawing.

Figure 9:
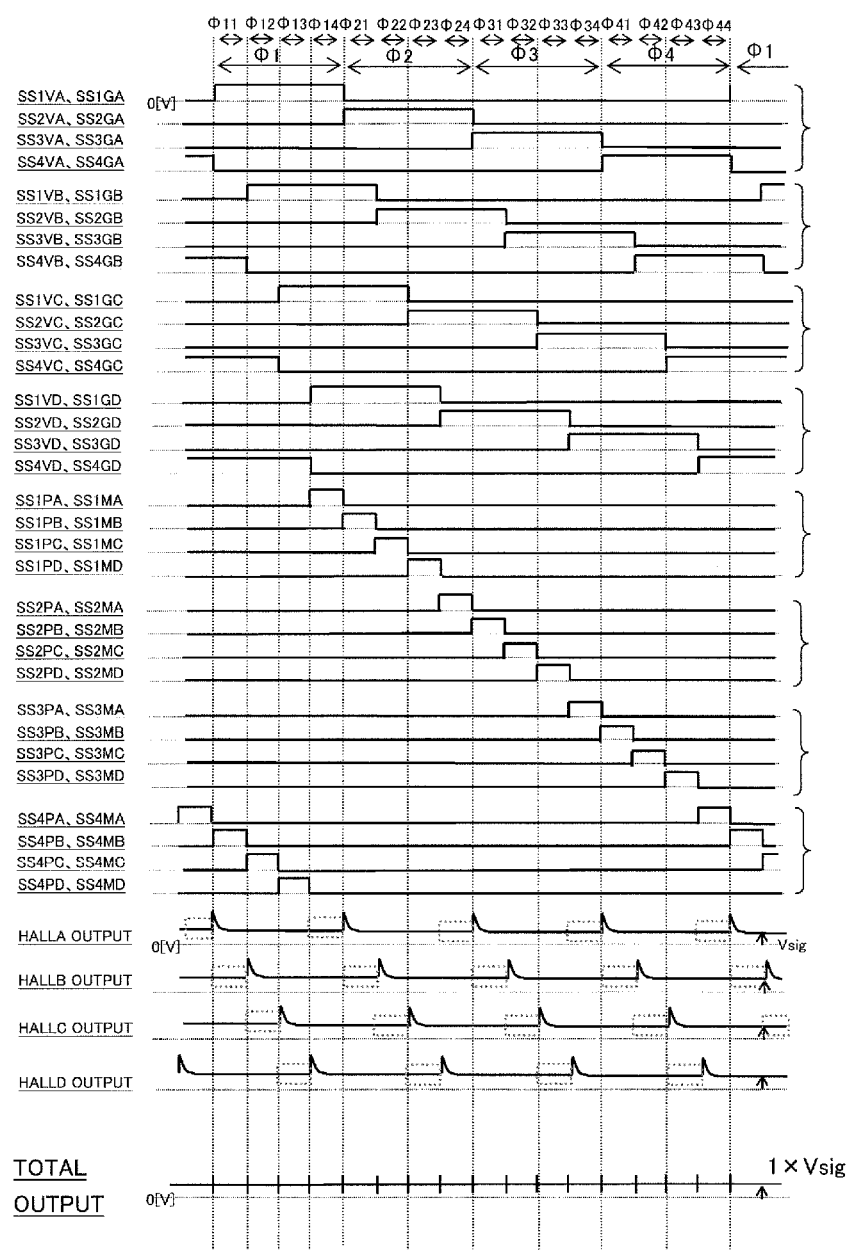
FIG. 9 is a time chart illustrating a circuit operation of the magnetic sensor circuit according to the third embodiment.

The operation of the magnetic sensor circuit according to the third embodiment will next be described. FIG. 9 is a time chart illustrating the circuit operation of the magnetic sensor circuit according to the third embodiment.

The time chart in the present embodiment is different from the time chart in the second embodiment in terms of the control signal of the second switch circuit 72. For example, in the hall element 1A, control signals (SS1PA and SS1MA) are assumed to be a high level during a period $\Phi 14$, control signals SS2PA and SS2MA are assumed to be a high level during a period $\Phi 24$, control signals SS3PA and SS3MA are assumed to be a high level during a period $\Phi 34$, and control signals SS4PA and SS4MA are assumed to be a high level during a period $\Phi 44$. Although control signals having a similar phase relationship are used even in the second to fourth hall elements 1B to 1D, the phase of each clock is shifted by one sub-period among the hall elements. Thus, as a signal processing input (INP-INM), a signal of the second hall element 1B is selected during a period $\Phi 11$, a signal of the third hall element 1C is selected during a period $\Phi 12$, a signal of the fourth hall element 1D is selected during a period $\Phi 13$, and a signal of the first hall element 1A is selected during a period $\Phi 14$. Even during other sub-periods, signals to be input to the signal processing circuit 16 are determined in a similar principle.

Thus, the magnetic sensor circuit according to the present embodiment has an advantage that no spike-like errors occur in the input of the signal processing circuit 16. In addition, since the four hall elements are used in the present embodiment, the spike-like error period is masked and the three sub-periods can be taken as the stable period. Therefore, the spike-like voltage errors caused by the capacity of the hall element are exponentially infinitely reduced. Consequently, it is possible to more improve a spinning frequency and a signal processing conversion rate (e.g., sampling rate of analog-to-digital converter) of the signal processing circuit 16. Thus, since the SN can be kept constant as a system of the magnetic sensor circuit, a loss in the magnetic sensor circuit can be avoided by increasing a clock rate. Further, the magnetic sensor circuit enables the signal processing circuit 16 to consecutively propagate the output signal voltage of each hall element and is suitable for consecutive signal processing.

<Fourth Embodiment>

Figure 10:
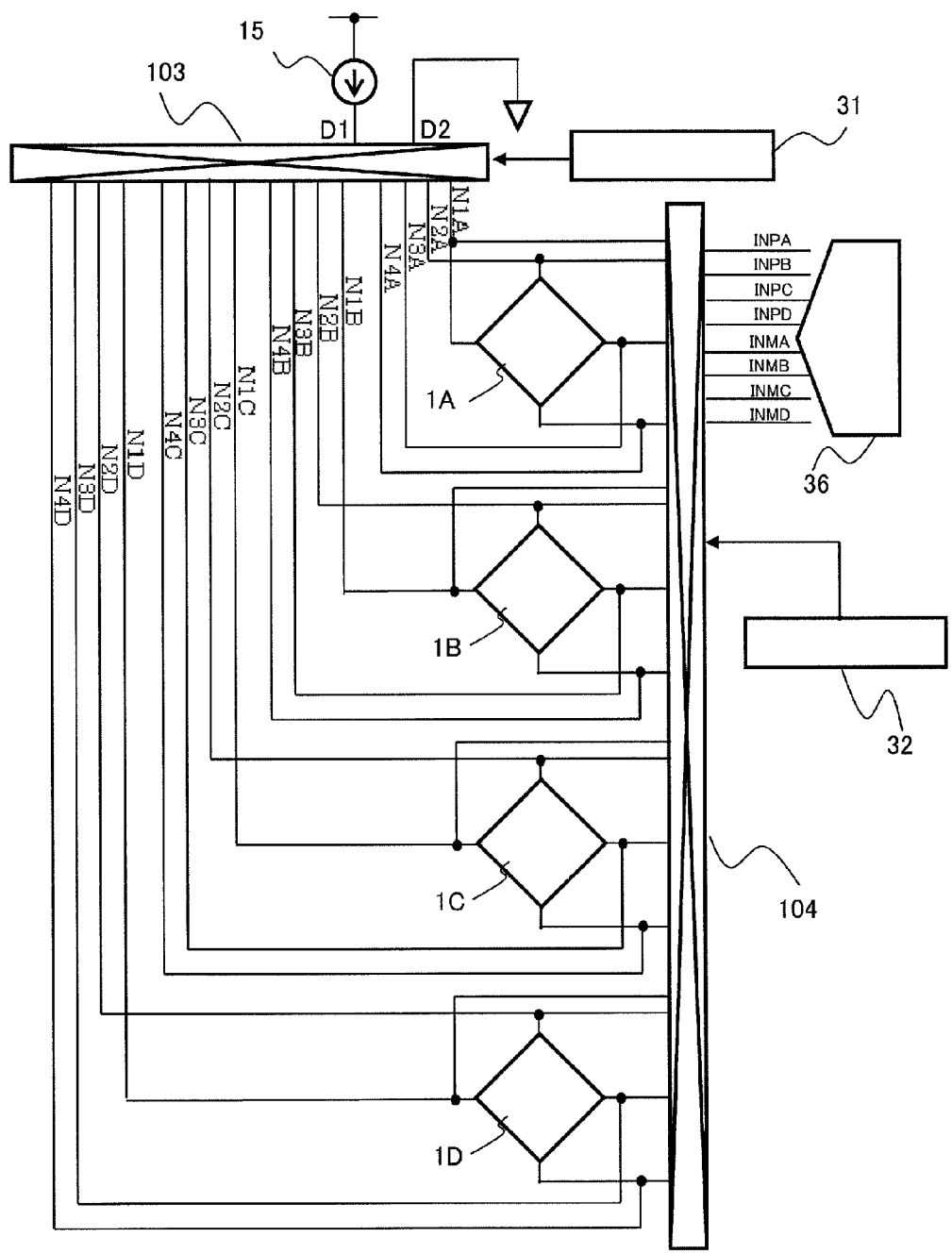
FIG. 10 is a circuit diagram of a magnetic sensor circuit according to a fourth embodiment.

FIG. 10 is a circuit diagram of a magnetic sensor circuit according to a fourth embodiment.

The magnetic sensor circuit according to the present embodiment is identical in circuit configuration to the second embodiment, but different in terms of a first switch circuit 103 and a second switch circuit 104.

Figure 11:
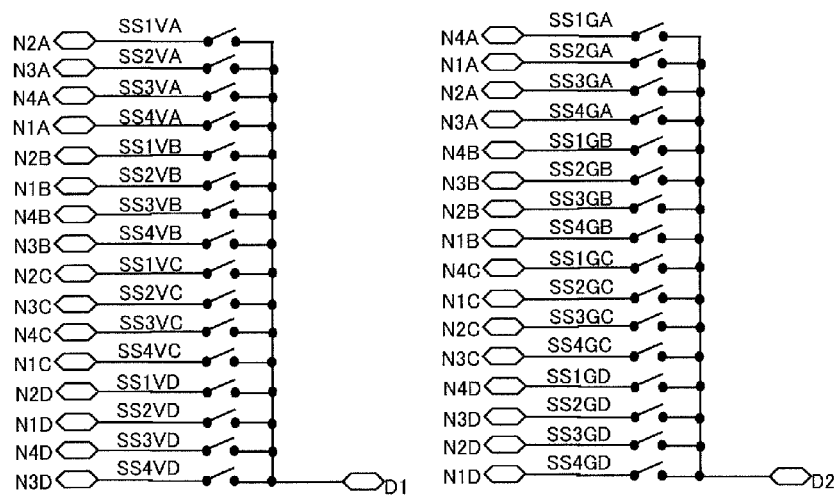
FIG. 11 is a circuit diagram illustrating one example of a first switch circuit of the magnetic sensor circuit according to the fourth embodiment.

FIG. 11 is a circuit diagram illustrating one example of the first switch circuit 103. Each input terminal, each output terminal, and each switch are connected and controlled in such a relationship as illustrated in the drawing. Thus, the first switch circuit 103 is connected in such a manner that a hall element 1A spins clockwise, a hall element 1B spins counterclockwise, a hall element 1C spins clockwise, and a hall element 1D spins counterclockwise.

Figure 12:
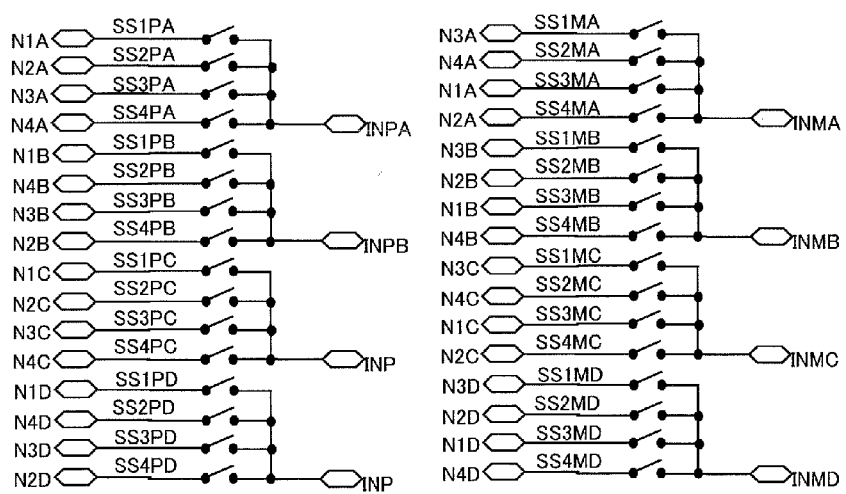
FIG. 12 is a circuit diagram illustrating one example of a second switch circuit of the magnetic sensor circuit according to the fourth embodiment.

FIG. 12 is a circuit diagram illustrating one example of the second switch circuit 104. Each input terminal, each output terminal, and each switch are connected and controlled in such a relationship as illustrated in the drawing. The second switch circuit 104 is also connected corresponding to spinning similar to that in the first switch circuit 103.

Figure 13:
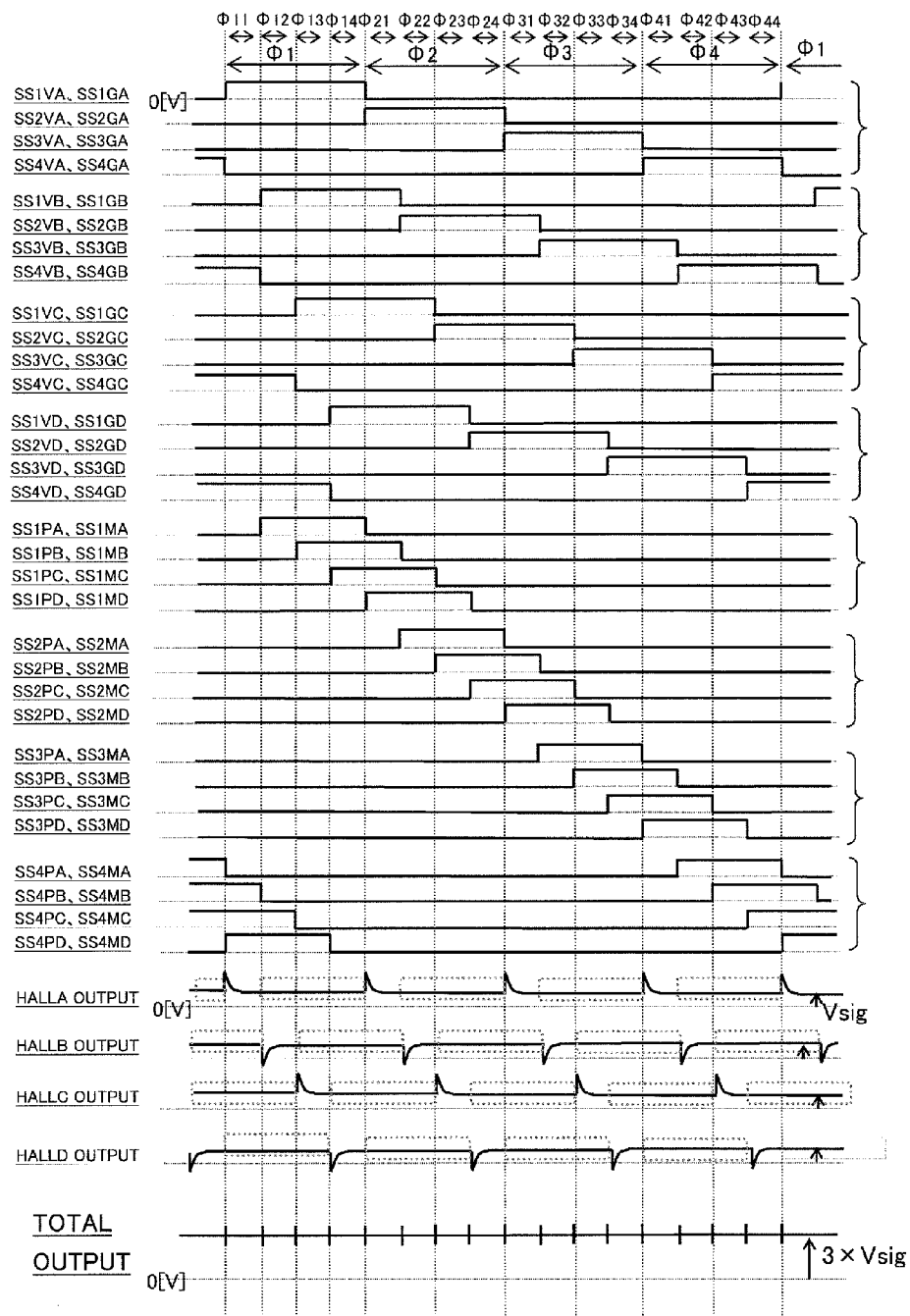
FIG. 13 is a time chart illustrating a circuit operation of the magnetic sensor circuit according to the fourth embodiment.

The operation of the magnetic sensor circuit according to the fourth embodiment will next be described. FIG. 13 is a time chart illustrating the circuit operation of the magnetic sensor circuit according to the fourth embodiment.

The time chart in the present embodiment is identical in control signal to the time chart in the second embodiment, but the sign of each spike-like voltage error of a differential signal between the hall element 1B and the hall element 1D is negative. This is because how to spin each hall element differs.

The period free of spikes is selected as the output in the magnetic sensor circuit according to the present embodiment, whereas in an actual circuit, a finite error in $(A \times \exp(-T/\tau))$, where T: masked settling time) is included with respect to a time constant $\tau$. Thus, in the hall elements 1A and 1C, a small error $(A \times \exp(-T/\tau))$ actually occurs. In the hall elements 1B and 1D, a small error $((-1) \times A \times \exp(-T/\tau))$ actually occurs. Thus, it is possible to more reduce a signal error component by canceling the influence of a residual error with respect to signal settling.

Since the post-settling voltage after spike disappearance is selected and outputted, the magnetic sensor circuit according to the present embodiment is substantially insensitive to the influence by the difference in waveform shape between the positive and negative spike voltages.

Figure 14:
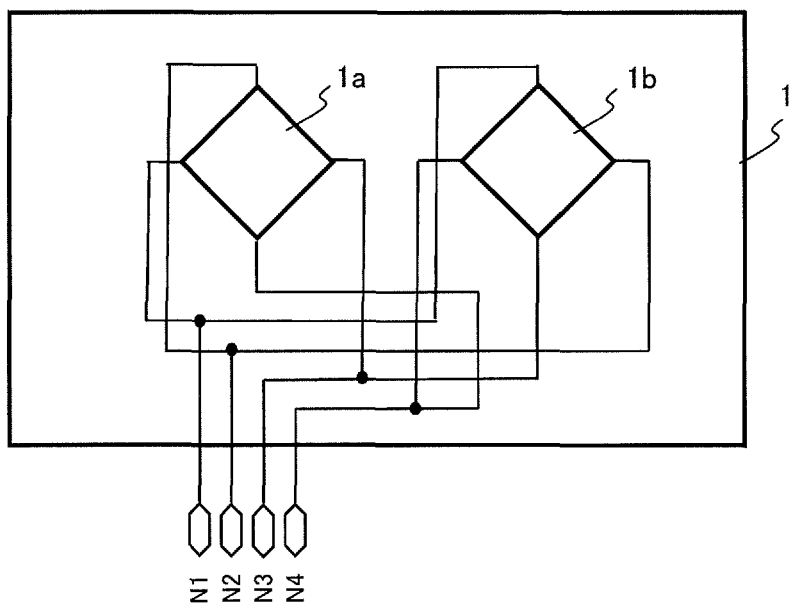
FIG. 14 is a circuit diagram illustrating one example of a configuration of a hall element of a magnetic sensor circuit of the present invention.
Figure 15:
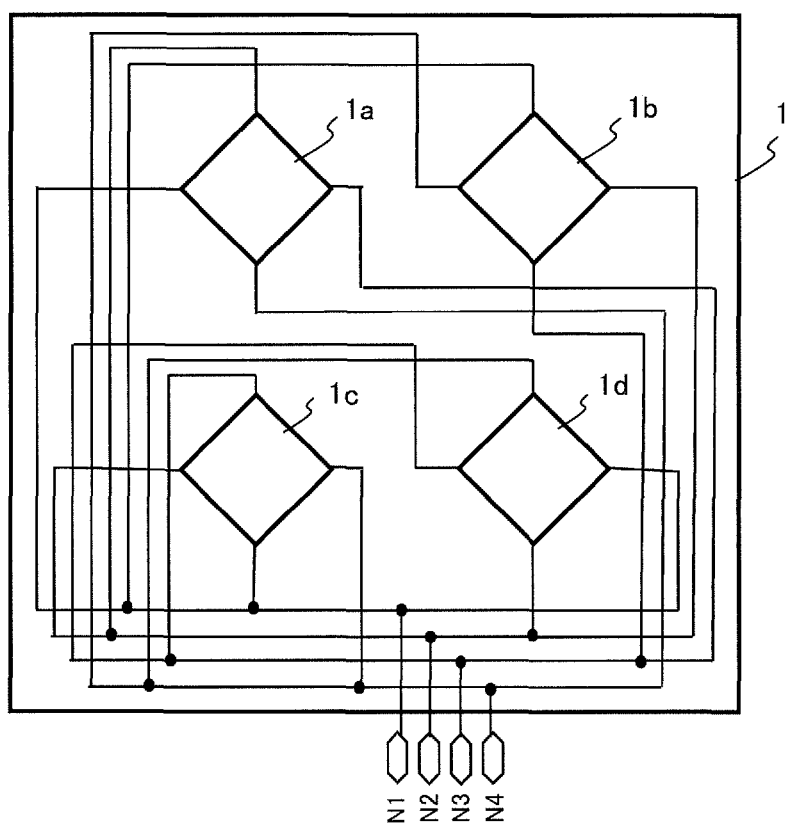
FIG. 15 is a circuit diagram illustrating one example of a configuration of a hall element of a magnetic sensor circuit of the present invention.

FIGS. 14 and 15 are respectively a circuit diagram illustrating one example of a configuration of a hall element of a magnetic sensor circuit of the present invention.

In FIG. 14, two hall elements 1a and 1b are connected to terminals N1 to N4 so as to be one hall element 1 as illustrated in the drawing. The hall elements 1a and 1b are connected so as to be one hall element 1 with the respective terminals being those different at 0° and 90°. It is possible to suppress the influence of variations and stress in manufacturing due to a layout by configuring the hall element 1 in this way.

The configuration of the hall element 1 illustrated in FIG. 15 is also similar.

Figure 16:
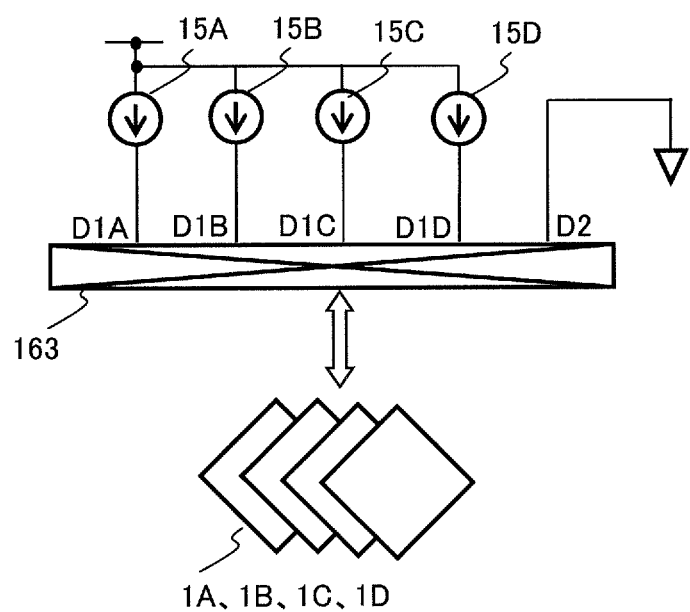
FIG. 16 is a circuit diagram illustrating one example of a configuration of a driving circuit of a magnetic sensor circuit of the present invention.
Figure 17:
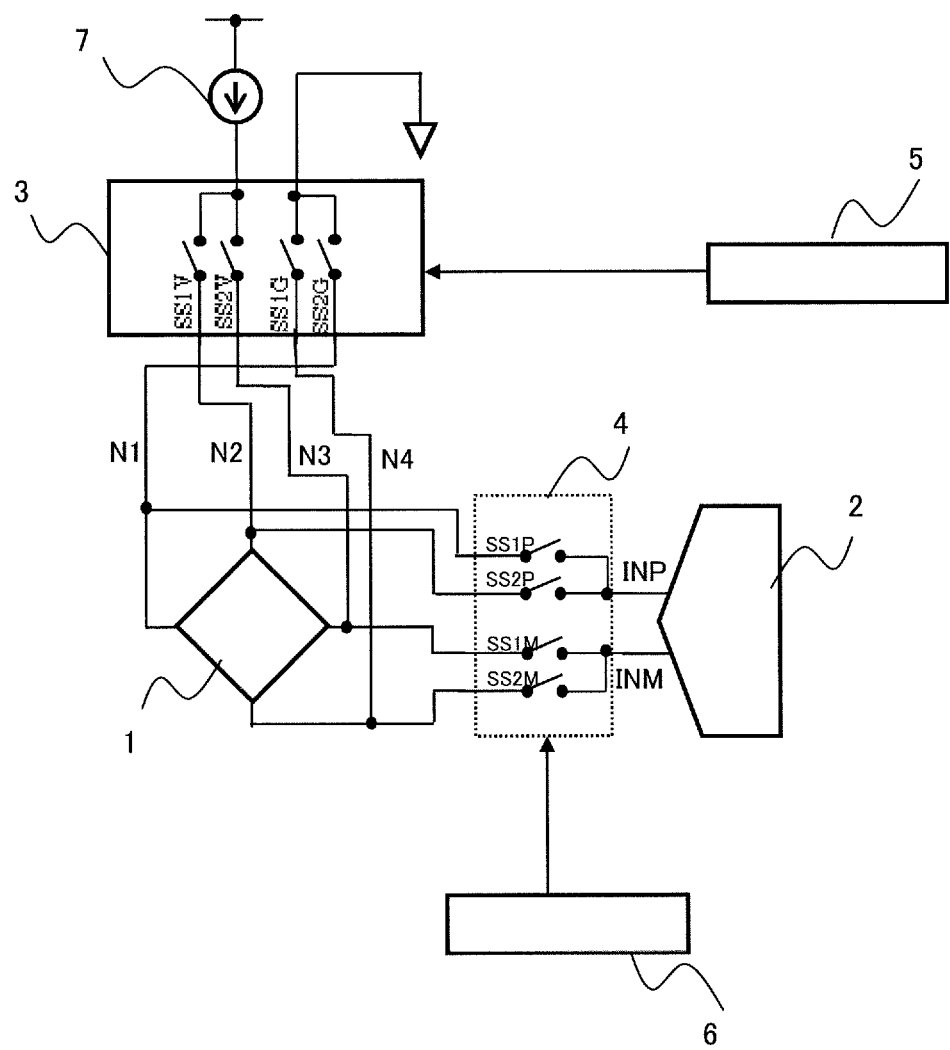
FIG. 17 is a circuit diagram illustrating a related art twice-spinning magnetic sensor circuit.
Figure 18:
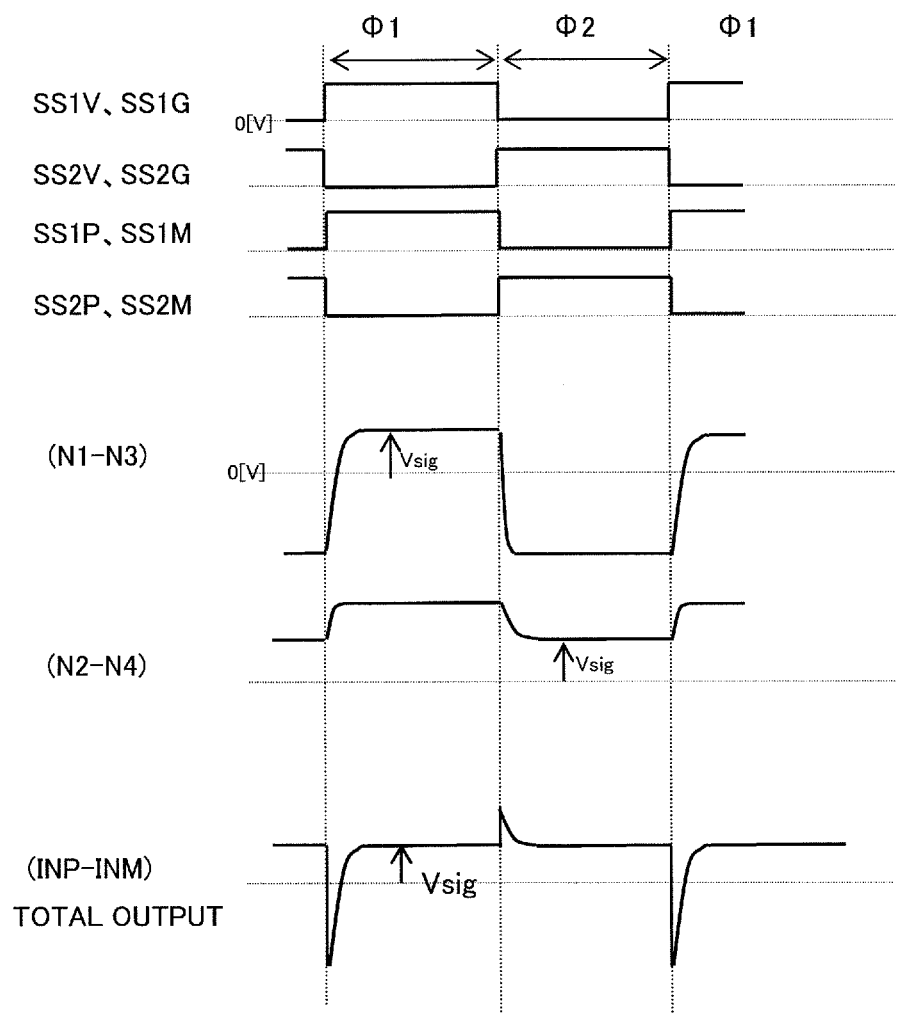
FIG. 18 is a time chart of the related art twice-spinning magnetic sensor circuit.

FIG. 16 is a circuit diagram illustrating one example of a configuration of a circuit for driving hall elements in a magnetic sensor circuit of the present invention.

The driving circuit in FIG. 16 is provided with four constant current sources 15A, 15B, 15C, and 15D which drive four hall elements 1A, 1B, 1C, and 1D. Further, a first switch circuit 163 performs control to switch the constant current sources for driving the hall elements every spinning. Thus, a slight signal fluctuation generated at a drive terminal upon spinning switching can be more suppressed by configuring the driving circuit in this way.

Further, in the case of the magnetic sensor circuit equipped with the four hall elements as illustrated in FIG. 16, the constant current sources for driving the hall elements are switched with four spinnings as one period. Such control on spinning makes it possible to suppress the influence of variations in current values of the constant current sources 15A, 15B, 15C, and 15D.

According to the driving circuit illustrated in FIG. 16, the magnetic sensor circuit of the present invention is capable of suppressing a slight signal fluctuation generated at a drive terminal upon spinning switching. Further, according to such a driving method as described above, it is possible to suppress current variations in each constant current source.

As described above, the description of the embodiment of the present invention is not limited to those illustrated in the drawings, such as the shapes, terminals and positional relations (0°, 90°, 180°, and 270°) of the hall elements, etc. Hall elements with other shapes and the number of other terminals are also included in the scope of the invention.

Further, the present invention is not limited to the above-described embodiments. It is a matter of course that the present invention includes various changes and modifications that will be made by a person skilled in the art within the scope of the present invention.

What is claimed is:

1. A magnetic sensor circuit comprising:
   a plurality of hall elements equipped with a plurality of terminals;
   a first switch circuit between the terminals of the hall elements, and a power supply terminal and a ground terminal and configured to supply driving currents to the hall elements;
   a second switch circuit connected to the terminals of the hall elements and configured to select and output signals of the hall elements;
   a first control circuit that outputs a first control signal to the first switch circuit;
   a second control circuit that outputs a second control signal to the second switch circuit; and
   a signal processing circuit configured to process signals in response to an output signal from the second switch circuit,
   wherein the first control circuit is configured to control the hall elements such that a timing at which spikes occur in the output signals of the plurality of hall elements are different from each other,
   wherein the second control circuit is configured to control the second switch circuit such that the second switch circuit does not select an output signal having a predetermined period during in which spikes occur, among the output signals of the hall elements, and to select an output signal having a predetermined period free of spikes among the output signals of the hall elements, and
   wherein at least one output signal of the plurality of hall elements is selected and output during all periods as the output signal of the second switch circuit.

2. The magnetic sensor circuit according to claim 1, further comprising a constant current source between the first switch circuit and the power supply terminal.

3. The magnetic sensor circuit according to claim 2, wherein the constant current source comprises a plurality of constant current sources and each constant current source corresponds to one of the plurality of hall elements, and
   wherein the constant current sources are connected to the hall elements by switching of the first switch circuit every spinning period.

4. The magnetic sensor circuit according to claim 1, wherein the hall elements are connected to the terminals thereof in such a manner that the plurality of hall elements operate as a signal hall element.

* * * * *

UNITED STATES PATENT AND TRADEMARK OFFICE
CERTIFICATE OF CORRECTION

| | |
|---|---|
| PATENT NO. | : 9,746,531 B2 |
| APPLICATION NO. | : 15/058807 |
| DATED | : August 29, 2017 |
| INVENTOR(S) | : Masao Iriguchi |

It is certified that error appears in the above-identified patent and that said Letters Patent is hereby corrected as shown below:

In the Claims

Claim 4, Column 10, Line 32 - delete "signal" and replace with "single"

Signed and Sealed this
Fourteenth Day of May, 2019

Andrei Iancu
*Director of the United States Patent and Trademark Office*